Patented May 3, 1949

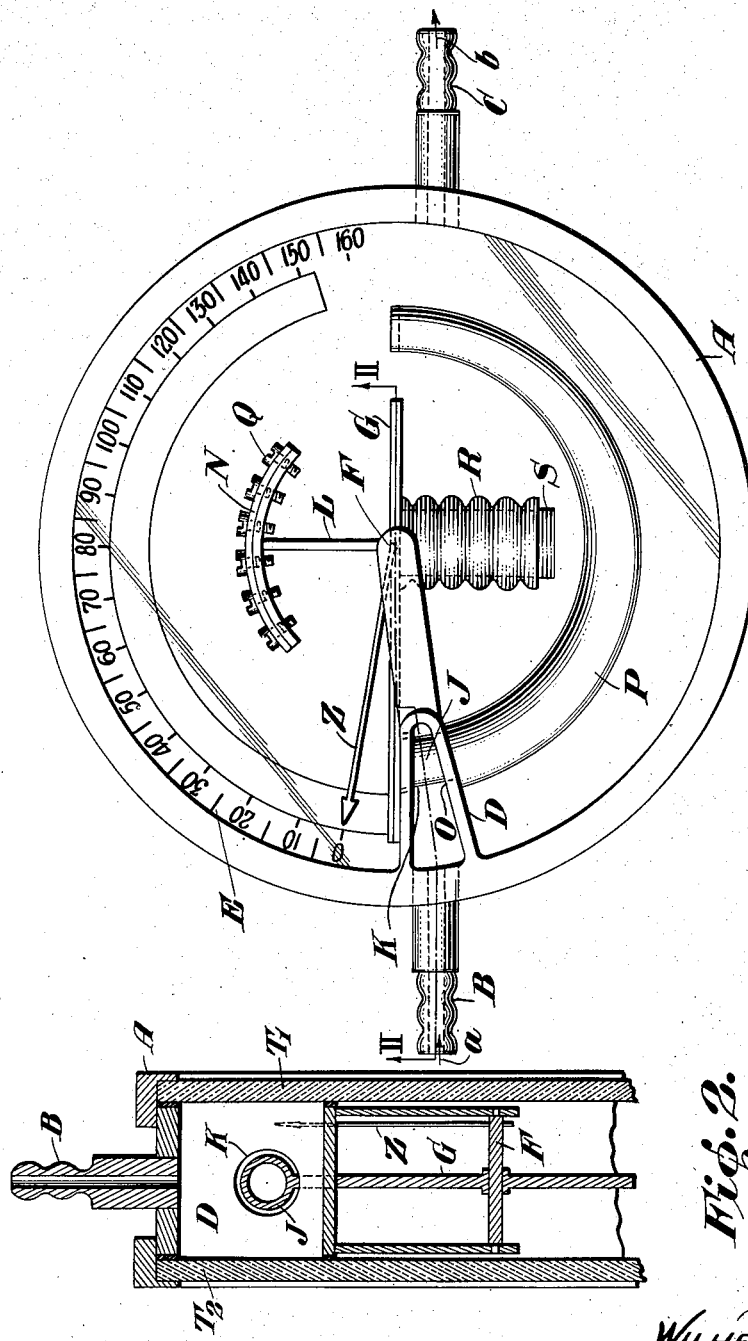

2,468,896

UNITED STATES PATENT OFFICE 2,468,896

INSTRUMENT FOR MEASURING AND INDICATING THE INTENSITY OF GAS CURRENTS

Wilhelm Rohn, Hanau on Main, Germany; vested in the Attorney General of the United States Application April 28, 1941, Serial No. 390,768
In Germany April 15, 1940

4 Claims. (Cl. 73—210)

This invention relates to an instrument for measuring the intensity of gas currents. For this purpose commonly revolving gas-meters or the like devices are used, and only some expensive types of instruments are available from which the volume of a gas flowing through a gaspipe per unit of time can be read off. Generally it is necessary to subsequently reduce the indications of such instruments to normal conditions of temperature and atmospheric pressure by reckoning.

The object of my invention is to provide an instrument of this type which is simple and cheap and from which the indications can be read off reduced to normal conditions of temperature and atmospheric pressure.

The instrument forming the object of my invention is illustrated in the accompanying drawing showing, by way of example, in Fig. 1 a side view of the instrument, and in Fig. 2 a fractional cross-section on the line II—II of Fig. 1.

A is a box-like casing provided at B and C with sockets for inserting the instrument into a pipeline in which the gas current flows, the intensity of which is to be measured and indicated. A sector-like fore-chamber D is arranged in the casing communicating with the inlet socket B. The front and the rear side of the casing may be covered with glass plates $T_1$, $T_2$, one of which may carry the indicating chart E.

In the middle of the casing the shaft F is arranged, preferably journaled in two jewel bearings. It carries a lever G to one end of which is secured the gas current damming body, here shown as an arcuate horn-like member J projecting through a hole K bored in one wall of the sector-like casing D and lying, in the zero position of the instrument, with its greater part in an arcuate horn-like sheath P tightly and firmly inserted into a hole O in the opposite wall of the casing D.

When the gas to be measured enters the sector at B in the direction of the arrow $a$ it attempts to pass over into the other part of the casing through the hole K and to leave it at C in the direction of the arrow $b$. In passing it presses the horn J out of the hole K and turns the shaft with the lever G in clockwise direction. As the horn-like member J tapers toward its free end, the annular gap between the horn J and the periphery of the hole K increases in width in accordance with the deflection of the lever G, and one stable position exists for each intensity of the gas current within the range of angular deflection of the instrument which intensity can be read off from the scale.

A pointer or index Z is rigidly connected with the shaft F and cooperates with the indicator chart E. The arm L extends from the lever G with its axis passing through the shaft and carries, according to the invention, as an adjustable counter-weight and, at the same time, as a temperature compensator a bimetallic strip N which may be weighted by screws or the like Q disposed at different points of the strip N. For instance, pins or screws of different weight may be put into holes distributed over the strip N. The bimetallic strip N is composed of two metallic materials having different moduli of thermal expansion; it has such dimensions that it bends more or less on heating. Hereby the weights Q arranged on the strip are more or less approached to the shaft F, and consequently the directive force exerted on the lever G is decreased or increased according as the weights are moved toward or away from the shaft F. This means that the lever G with the horn-like member J is deflected to a lesser or greater extent by the gas issuing from the chamber D than would be the case with the weights Q of the strip N in the position shown in Fig. 1. With the gas expanded because of elevated temperature a relatively smaller volume of gas is indicated to enable a reading corresponding to normal conditions. If desired the scale may be calibrated in kilograms per hour.

By suitably choosing the taper of the horn-like member J and the weight of the counter-weight N, Q, the measuring range of the instrument can be chosen at will. As a rule the shaft F of the instrument will be placed in a horizontal position, but by turning the measuring instrument about the axis of the sockets B and C, so as to bring the shaft F into an inclined position, the measuring system may be more or less approached to its labile position. Hereby it is possible to vary the sensibility of the instrument within wide limits. By arranging the inlet socket B and the outlet socket C on a horizontal line and providing them with stuffing boxes one and the same instrument may be used for different measuring ranges.

The lever G further carries a corrugated tube R closed at both ends and weighted by the body S. As herein shown, the tube R extends from the lever G on the opposite side from the arm L and its longitudinal axis passes through the shaft F. This tube serves for pressure compensation. Its action depends upon its property of being compressed by increasing pressure. Thereby the center of gravity of the weight S is displaced toward the shaft F and exerts a smaller directive force on the lever G whereby the deflection of the lever G including the horn-like member J secured thereto is increased. The corrugated tube R and the weight S may have such dimensions that the increased deflection of the lever G under the action of the pressure just compensates for the decrease of the gas volume to be indicated.

By arranging the corrugated tube below the axis of rotation the overweight producing the directive force on increase of the pressure may be diminished.

I claim:

1. An instrument for measuring and indicating the intensity of a gas current and reducing the measurement to indications of rate of flow at normal conditions of temperature and pressure, comprising a casing having a wall having an orifice through which the fluid to be metered flows, a shaft rotatably mounted in said casing, a lever carried by the shaft, a damming body carried by the lever and cooperating with said orifice to be responsive to the rate of flow, a weighted bimetallic strip connected with said lever to compensate for temperature changes, and a weighted corrugated tube, closed at both ends and connected with said lever to compensate for pressure changes, and indicating means including a movable member carried by the shaft.

2. A measuring and indicating instrument as recited in claim 1, wherein said strip and said weighted tube are disposed on opposite sides of said lever.

3. A measuring and indicating instrument as recited in claim 1, wherein said strip and said weighted tube are disposed on opposite sides of said lever along a line extending at substantially right angles to the lever and passing through said shaft, the transverse and longitudinal axes of said strip and tube respectively substantially coinciding with said line.

4. A measuring and indicating instrument as recited in claim 1, wherein the transverse and longitudinal axes of said strip and said weighted tube respectively pass through said shaft from opposite sides of said lever.

WILHELM ROHN.

REFERENCES CITED

The following references are of record in the file of this patent:

UNITED STATES PATENTS

| Number | Name | Date |
| --- | --- | --- |
| 999,950 | Berthelot et al. | Aug. 8, 1911 |
| 1,401,299 | Wohlenberg | Dec. 27, 1921 |
| 1,538,164 | Buell | May 19, 1925 |
| 1,788,976 | Beraud et al. | Jan. 13, 1931 |
| 1,972,736 | Haug | Sept. 4, 1934 |
| 2,103,262 | Knerr | Dec. 28, 1937 |

FOREIGN PATENTS

| Number | Country | Date |
| --- | --- | --- |
| 613,282 | France | Aug. 20, 1926 |
| 745,170 | France | Feb. 7, 1933 |
| 748,247 | France | Apr. 10, 1933 |